(12) United States Patent
Martyn

(10) Patent No.: US 9,797,487 B2
(45) Date of Patent: *Oct. 24, 2017

(54) APPARATUS FOR CONVERTING MOTION

(71) Applicant: Ten Fold Engineering Limited, Buckinghamshire (GB)

(72) Inventor: David Martyn, Bath (GB)

(73) Assignee: Ten Fold Engineering Limited (GB)

( * ) Notice: Subject to any disclaimer, the term of this patent is extended or adjusted under 35 U.S.C. 154(b) by 123 days.

This patent is subject to a terminal disclaimer.

(21) Appl. No.: 14/422,943

(22) PCT Filed: Aug. 16, 2013

(86) PCT No.: PCT/GB2013/000348
§ 371 (c)(1),
(2) Date: Feb. 20, 2015

(87) PCT Pub. No.: WO2014/029954
PCT Pub. Date: Feb. 27, 2014

(65) Prior Publication Data
US 2016/0186842 A1    Jun. 30, 2016

(30) Foreign Application Priority Data

Aug. 22, 2012 (GB) .................................. 1214929.0

(51) Int. Cl.
| | | |
|---|---|---|
| *F16H 21/10* | (2006.01) | |
| *F16H 21/04* | (2006.01) | |
| *E04F 10/06* | (2006.01) | |

(52) U.S. Cl.
CPC .......... *F16H 21/10* (2013.01); *E04F 10/0629* (2013.01); *F16H 21/04* (2013.01)

(58) Field of Classification Search
CPC .......... B65B 3/12; A24F 47/002; F16H 21/04; F16H 21/44; E04B 1/344; E04B 1/34441; E04B 1/3445
See application file for complete search history.

(56) References Cited

U.S. PATENT DOCUMENTS

| 4,989,914 A | 2/1991 | Pine |
|---|---|---|
| 6,558,107 B1 | 5/2003 | Okuno |
| (Continued) | | |

FOREIGN PATENT DOCUMENTS

| DE | 102009039967 A1 * | 3/2011 | ............... B64C 9/04 |
|---|---|---|---|
| EP | 0787546 A1 | 8/1997 | |
| (Continued) | | | |

OTHER PUBLICATIONS

International Search Report, PCT Application No. PCT/GB2013/000348 dated May 26, 2015, 4 pages.

*Primary Examiner* — Jeanette E Chapman
(74) *Attorney, Agent, or Firm* — Jason Saunders; Arnold & Saunders, LLP; Christopher McKeon

(57) ABSTRACT

An assembly for converting motion is provided, the assembly comprising: a first arm rotatable about a first fixed pivot; a second arm rotatable about a second fixed pivot, the second fixed pivot spaced apart from the first fixed pivot; a third arm pivotably connected to the second arm; a fourth arm pivotably connected to the second arm; a first connecting arm pivotably connected to and extending between the first arm and the third arm; a second connecting arm pivotably connected to and extending between the first arm and the second arm; and a third connecting arm pivotably connected to and extending between the first arm and the fourth arm. The assembly finds particular use in the support and movement of moveable building assemblies.

22 Claims, 12 Drawing Sheets

(56) References Cited

U.S. PATENT DOCUMENTS

| | | | | |
|---|---|---|---|---|
| 9,528,579 B2 * | 12/2016 | Martyn | ................... | F16H 21/04 |
| 2015/0122081 A1 * | 5/2015 | Martyn | ................... | F16H 21/04 |
| | | | | 74/99 R |
| 2016/0102740 A1 * | 4/2016 | Martyn | ................... | F16H 21/04 |
| | | | | 52/69 |
| 2016/0195174 A1 * | 7/2016 | Martyn | ................... | F16H 21/04 |
| | | | | 52/9 |
| 2016/0195175 A1 * | 7/2016 | Martyn | ................... | F16H 21/04 |
| | | | | 74/99 R |

FOREIGN PATENT DOCUMENTS

| | | | | |
|---|---|---|---|---|
| FR | 2254176 A5 * | 7/1975 | ............. | A01G 25/09 |
| FR | EP 0424266 A1 * | 4/1991 | ............. | B62D 57/02 |
| GB | 2505676 A * | 3/2014 | ........... | E04B 1/3441 |
| GB | 2529701 A * | 3/2016 | ............. | F16H 21/04 |
| GB | 2529702 A * | 3/2016 | ........... | E04B 1/3441 |
| SU | 1252577 A1 * | 8/1986 | | |
| WO | 9733725 | 9/1997 | | |

\* cited by examiner

APPARATUS FOR CONVERTING MOTION

The present invention relates to an apparatus for converting motion. In one aspect, the apparatus may be used to producing a straight line motion, in particular an apparatus for producing motion of a component in a straight line generated by the rotational movement of a second component or the motion of the second component about a pivot. In a further aspect, the apparatus may be used to both displace and rotate a first component with respect to a second component.

Mechanisms for converting motion, in particular producing a straight line motion from a rotational motion are known in the art. Such straight line mechanisms may be characterised by comprising a first member rotatable about an axis passing through the member and a second member linked to or associated with the first member, the arrangement being such that rotational movement of the first member about the axis results in a straight line movement of the second member.

Examples of early mechanisms for producing a straight line motion include the straight line mechanism design by James Watt, comprising a series of three levers in end-to-end configuration, with movement of the two end levers about pivots at their free ends causing the middle lever to follow a close approximation to a straight line over a portion of its movement. A related linkage comprising three levers, with the middle lever constrained to follow a straight line was proposed by Tchebicheff. The Peaucellier-Lipkin inversor consists of an arrangement of seven levers and provides a conversion of circular motion into linear motion and vice versa. A related four-lever mechanism was proposed by Hart. A linear converter, known as the half beam mechanism, in which a first linear motion is converted to a second linear motion perpendicular to the first, was designed by Scott Russell.

An analysis of a variety of multi-lever, straight line linkages is provided by Dijksman, E. A. 'Advances in Robot Kinematics and Computationed Geometry', pages 411 to 420, [1994] Kluwer Academic Publishers.

U.S. Pat. No. 4,248,103 discloses a straight line mechanism, in particular a mechanism of the so-called 'conchoid' type. There is disclosed a linkage mechanism for an industrial manipulator comprising at least two of the said straight line mechanisms.

U.S. Pat. No. 4,400,985 concerns a straight line link mechanism, comprising a plurality of pivotally connected links. The links are connected between a support and a controlled member. As one of the links is moved in a 360° arc, the controlled member alternately moves in a first direction along a linear path and thereafter in the opposite direction along a curved path. The weight of the controlled member may be balanced by the use of a counter weight, to provide a lifting mechanism. A cam may be employed to control the motion of the controlled member.

More recently, U.S. Pat. No. 4,747,353 discloses a straight line motion mechanism formed from a pair linkage mechanisms arranged in a parallelogram in combination with a motion control means. The motion control means interconnects the two linkage mechanisms and provide a uniform angular displacement of each linkage mechanism.

U.S. Pat. No. 5,102,290 concerns a transfer device for transferring a workpiece from a first location to a second location. The workpiece is moved in a trochoidal arc by means of a pickup arm mounted to roll along a flat surface.

A straight line mechanism is disclosed in U.S. Pat. No. 5,237,887. The mechanism comprises a static base and a platform supported by first and second arm assemblies. Each of the first and second arm assemblies comprises portions pivotally connected to the static base. The arrangement of the pivoted arm portions of each arm assembly is such that the platform is constrained to move in a straight line, as the portions of the arms move about their respective pivot connections.

Still more recently, WO 97/33725 discloses a device for the relative movement of two elements. The device comprises at least two first links connected to a first element by a hinged connection so as to form a four-hinge system and pivot in a plane parallel to the plane of the first element. At least two second links are connected to the second element so as to form a four-hinge system and to pivot in a plane parallel to the plane of the second element. The two four-hinge systems provided by the first and second links are coupled in series to allow relative motion of the first and second elements.

WO 99/14018 discloses a device for the relative movement of two elements. The device comprises at least two link devices coupled between the elements, each comprising two mutually articulated link units. A first link unit is connected to first, moveable element. The second of the link units is connected to the second, static element. Power applied to the link units causes the first element to move relative to the second.

Multilever mechanisms are disclosed in SU 1044871 and JP 2003065415.

There is a need for an improved assembly for providing a straight line motion, in particular for providing an element moveable in a straight line in response to a rotational motion. It would be most advantageous if the assembly could be arranged in a compact form, thereby occupying only a small volume of space.

An assembly for converting a rotary motion into a straight line motion comprising an assembly of five levers or arms having pivoted connections therebetween is disclosed in pending GB patent application No. GB1209982.6 entitled 'Apparatus for converting motion'. An alternative assembly for providing both linear motion and a rotational motion has now been found comprising seven pivotally connected levers or arms.

According to the present invention, there is provided an assembly for converting motion, the assembly comprising:

a first arm rotatable at a first position thereon about a first fixed pivot;

a second arm rotatable at a first position thereon about a second fixed pivot, the second fixed pivot spaced apart from the first fixed pivot;

a third arm pivotably connected at a first position thereon to the second arm at a second position on the second arm, the second position spaced apart from the first position on the second arm;

a fourth arm pivotably connected at a first position thereon to the second arm at a third position on the second arm;

a first connecting arm extending between the first arm and the third arm, the first connecting arm pivotably connected to a second position on the first arm spaced apart from the first position and pivotably connected to the third arm at a second position thereon spaced apart from the first position thereon;

a second connecting arm extending between the first arm and the second arm, the second connecting arm pivotably connected to a third position on the first arm disposed between the first and second positions thereon and pivotably connected to a fourth position on the second arm at a third position thereon; and a third connecting arm extending between the first arm and the fourth arm, the third connecting arm pivotably connected to a fourth position on the first arm and pivotably connected to a second position on the fourth arm.

In operation of the assembly, rotation of the first arm about the first fixed pivot results in rotation of the second arm about the second fixed pivot and movement of the third arm. In particular, the third arm is caused to move such that a point on the third arm (herein referred to as 'the said point') spaced from the first position on the third arm and located such that the second position on the third arm lies between the said point and the first position moves in a straight line. Thus, rotational motion of the first arm and the second arm about their respective fixed pivots results in a straight line motion of the said point on the third arm. In this respect, it is to be noted that the said point on the third arm referred to traces a line that is substantially straight, that is represents a very close approximation to a straight line. In particular, the path followed by the said point may be characterised as being a very flat sine wave, that is a sine wave of high wavelength and very low amplitude.

The point on the third arm referred to above is spaced from the first position on the third arm, with the second position on the third arm lying between the said point and the first position. The location of the said point will depend upon the length of the arms of the device and the positions of their interconnections. In one preferred embodiment, the said point is arranged to be at a distal location on the third arm, that is distal from the first and second positions on the third arm, preferably with the said point being located at the free end of the third arm or in an end portion at the free end of the arm.

The extent of the straight line motion of the said point on the third arm varies according the precise positioning of the connections between the arms. For example, in one embodiment, it has been found that this close approximation to a straight line motion by the said point on the third arm occurs over a distance that is up to 85% of the distance between the first and second fixed pivots. Further embodiments provide motion of the said point on the third arm that follows a close approximation to a straight line for a distance up to or exceeding 100% of the distance between the first and second fixed pivots. References herein to a motion of the said point on the third arm in a 'straight line' are references to this movement.

As noted, the said point on the third arm moves in a pattern that is a close approximation to a straight line. The deviation of the movement of the said point from a straight line may be exemplified by the following:

In an embodiment of the assembly in which the distance between the first fixed pivot and the second fixed pivot is 3250 mm, the said point on the third arm describes an approximate straight line of 2750 mm in length. In particular, the said point moves between a retracted position and a first extended position. In this respect, references to motion of the said point are with respect to the line joining the first and second fixed pivots, with the retracted position being at or close to the line joining the first and second fixed pivots and the retracted position being distant therefrom. As noted, the said point on the third arm moves between the retracted position and the first extended position, with the line joining the retracted and first extended positions being a straight line substantially perpendicular to the line extending between the first and second pivots. However, in moving between the retracted and first extended positions, the said point follows a sine wave having a maximum deviation from the straight line of 8 mm. This deviation represents a deviation of just 0.25% of the distance travelled by the said point between the retracted and extended positions and is generally insignificant in the context of most if not all practical applications of the assembly.

In another embodiment of the assembly in which the distance between the first fixed pivot and the second fixed pivot is 3250 mm, the said point on the third arm describes an approximate straight line of 3254 mm in length. In this embodiment, the deviation of the said point moves in a sine wave having a maximum deviation from a straight line of just 31.4 mm, that is just 0.96% of the distance travelled by the said point.

The arrangement of the assembly of the present invention may be varied depending upon the requirements. For example, the assembly may be arranged to provide a longer straight line movement of the said point on the third arm with a slightly greater deviation from a straight line. Alternatively, the assembly may be arranged to provide a shorter straight line movement of the said point, with the path traced by the said point being a closer approximation to a straight line with less deviation.

When moving between the retracted and the first extended positions, the said point on the third arm follows a substantially straight line. Other points on the third arm follow a respective arc.

As noted above, the assembly of the present invention provides a motion of the said point on the third arm that follows a straight line over a specific extent of its movement. The close approximation of the movement of the said point on the third arm to a straight line between the retracted and first extended positions makes the assembly of the present invention particularly useful as a straight line converter, that is able to convert a rotational movement of the first and/or second arms about the first and second fixed pivots respectively, into a straight line motion of the said point on the third arm. However, the operation of the assembly is not limited to this extent of movement of the third arm. Rather, continued movement of the assembly beyond the first extended position to a super-extended position causes the third arm to move to a position that is perpendicular to and displaced from the line joining the first and second fixed pivots. This movement of the third arm away from the line joining the first and second fixed pivots with simultaneous rotation of the third arm, once beyond the first extended position, is also particularly useful, for example in deploying items connected to the third arm away from the line joining the first and second fixed pivots. Indeed, it has been found that the third arm may be moved to a position in which it extends at any desired angle to the line joining the first and second pivots, in particular up to and including perpendicular to the line. In addition, the third arm may be moved beyond this position perpendicular to the line joining the first and second pivots, if required.

The assembly further comprises a fourth arm, connected to the second arm, as described above. In operation of the assembly, rotation of the first arm about the first fixed pivot results in rotation of the second arm about the second fixed pivot and movement of the fourth arm. In particular, the fourth arm is caused to move in a motion similar to that of the third arm, that is such that a point on the fourth arm (herein referred to again as 'the said point') spaced from the first position on the fourth arm and located such that the second position on the fourth arm lies between the said point and the first position moves in a straight line. Thus, rotational motion of the first arm and the second arm about their respective fixed pivots results in a straight line motion of the said point on the fourth arm. In this respect, it is to be noted that the said point on the fourth arm referred to traces a line that is substantially straight, that is represents a very close approximation to a straight line. In particular, the path followed by the said point on the fourth arm may be characterised as being a very flat sine wave, that is a sine wave of high wavelength and very low amplitude.

The said point on the fourth arm referred to above is spaced from the first position on the fourth arm, with the second position on the fourth arm lying between the said point and the first position. The location of the said point will depend upon the length of the arms of the device and the positions of their interconnections. In one preferred embodiment, the said point is arranged to be at a distal location on the fourth arm, that is distal from the first and second positions on the fourth arm, preferably with the said point being located at the free end of the fourth arm or in an end portion at the free end of the arm.

The extent of the straight line motion of the said point on the fourth arm varies according the precise positioning of the connections between the arms, as with the third arm described above. For example, in one embodiment, it has been found that this close approximation to a straight line motion by the said point on the fourth arm occurs over a distance that is up to 85% of the distance between the first and second fixed pivots. Further embodiments provide motion of the said point on the fourth arm that follows a close approximation to a straight line for a distance up to or exceeding 100% of the distance between the first and second fixed pivots. References herein to a motion of the said point on the fourth arm in a 'straight line' are references to this movement.

As noted, the said point on the fourth arm moves in a pattern that is a close approximation to a straight line. The deviation of the movement of the said point from a straight line may be exemplified by the following:

In an embodiment of the assembly in which the distance between the first fixed pivot and the second fixed pivot is 3250 mm, the said point on the fourth arm describes an approximate straight line of 2750 mm in length. In particular, the said point moves between a retracted position and a second extended position. In this respect, references to motion of the said point on the fourth arm are with respect to the line joining the first and second fixed pivots, with the retracted position being at or close to the line joining the first and second fixed pivots and the retracted position being distant therefrom. As noted, the said point on the fourth arm moves between the retracted position and the second extended position, with the line joining the retracted and second extended positions being a straight line substantially perpendicular to the line extending between the first and second pivots. However, in moving between the retracted and second extended positions, the said point follows a sine wave having a maximum deviation from the straight line of 8 mm. This deviation represents a deviation of just 0.25% of the distance travelled by the said point between the retracted and second extended positions and is generally insignificant in the context of most if not all practical applications of the assembly.

In another embodiment of the assembly in which the distance between the first fixed pivot and the second fixed pivot is 3250 mm, the said point on the fourth arm describes an approximate straight line of 3254 mm in length. In this embodiment, the deviation of the said point moves in a sine wave having a maximum deviation from a straight line of just 31.4 mm, that is just 0.96% of the distance travelled by the said point.

The arrangement of the assembly of the present invention may be varied depending upon the requirements. For example, the assembly may be arranged to provide a longer straight line movement of the said point on the fourth arm with a slightly greater deviation from a straight line. Alternatively, the assembly may be arranged to provide a shorter straight line movement of the said point, with the path traced by the said point being a closer approximation to a straight line with less deviation.

When moving between the retracted and the extended positions, the said point on the fourth arm follows a substantially straight line. Other points on the fourth arm follow a respective arc.

Continued movement of the assembly beyond the second extended position to a super-extended position causes the fourth arm to move to a position that is perpendicular to and displaced from the line joining the first and second fixed pivots. This movement of the fourth arm away from the line joining the first and second fixed pivots with simultaneous rotation of the fourth arm, once beyond the extended position, is also particularly useful, for example in deploying items connected to the fourth arm away from the line joining the first and second fixed pivots. Indeed, it has been found that, as with the third arm, the fourth arm may be moved to a position in which it extends at any desired angle to the line joining the first and second pivots, in particular up to and including perpendicular to the line. In addition, the fourth arm may be moved beyond the position perpendicular to the line joining the first and second pivots, if required.

It will be appreciated that the angle of the third arm with respect to the line joining the first and second pivots and the angle of the fourth arm with respect to the line joining the first and second pivots are different at each position of the assembly, once the assembly is moved from the retracted position.

As noted above, the motion of the third and fourth arms may be varied by the length of the other components of the assembly. The relative positions and angles of the third and fourth arms at different positions in the movement of the assembly from the retracted position may also be varied by appropriate selection of the length of the other components of the assembly.

In one particularly preferred embodiment, the assembly is arranged such that the said point on the fourth arm moves in a straight line, as described above, throughout the duration of the movement of the third arm from the retracted position to the super-extended position in which the third arm extends substantially perpendicular to the line joining the first and second pivots.

It has been found that the aforementioned assembly provides a number of significant advantages. First, the points of the assembly on the third and fourth arms that trace a straight line move away from the mechanism. As noted, the assembly may be considered to be movable from a retracted position to a plurality of extended positions, with a point on the third arm moving in a straight line between the retracted position and a first extended position and a point on the fourth arm moving in a straight line between the retracted position and a second extended position.

The said points on each of the third and fourth arms move in a straight line away from the retracted position to the extended positions. In particular, the assembly is such that, in operation, a point on the third arm traces a straight line to the first extended position that extends away from the first and second fixed pivot points, in particular from the line joining the first and second pivot points. Similarly, a point on the fourth arm traces a straight line to the second extended position that extends away from the first and second fixed pivot points, in particular from the line joining the first and second pivot points. More particularly, in many embodiments, the straight line path followed by the said points on the third and fourth arms extend perpendicular to the line joining the first and second pivot points. This is an advantage over assemblies of the prior art and allows the assembly of the present invention to be more versatile and have a wider range of applications. In particular, it allows the assembly to be placed or mounted on a plane and to have all motion of the components confined to one side of the plane. Thus, for example, the assembly may be used on an exterior surface of a construction, such as a building or the like, and all components move from the retracted to the extended positions on the exterior, without encroaching on or requiring space on the interior side of the plane.

Further, the arms of the assembly may be constructed such that the arms may be accommodated one within another. The components of the assembly may be arranged such that, when in the retracted position, the third and fourth arms and the first and second connecting arms are accommodated within or adjacent the first and second arms, thereby providing for a particularly compact assembly when in the retracted position.

The assembly has been defined hereinbefore by reference to a plurality of arms. It is to be understood that the term 'arm' is used as a general reference to any component that may be connected as hereinbefore described and/or moved about a fixed pivot. Accordingly, the term 'arm' is to be understood as being a reference to any such component, regardless of shape or configuration. In a preferred embodiment, the arms are elongate members, in particular formed to allow the arms to be accommodated within one another, as described above.

As noted, operation of the assembly results in motion of the third and fourth arms. It is to be understood that the assembly may be used to convert a rotational motion of the first or second arms about the first or second fixed pivots into motion of the said points on the third and fourth arms, that is by having drive to the assembly provided at the first or second arms. Alternatively, the assembly may be used to convert a motion of the third arm or the fourth arm, for example a linear motion, into a rotational motion of the first and second arms, that is by having drive to the assembly applied at one or both of the third or fourth arms.

The assembly of the present invention comprises a first arm. The first arm may have any shape and configuration. A preferred form for the first arm is an elongate member, for example a bar or a rod. The first arm is pivotably mounted at a first position on the arm to a first fixed pivot. The pivotable connection at the first position may be of any suitable form, preferably a pin, spindle or axle passing through the arm about which the arm is free to move.

The first arm may function as a driving arm for the assembly, that is have a force applied thereto so as to rotate the arm about the fixed pivot at the first position on the arm, thereby transferring drive to the other components of the assembly. Alternatively, the first arm may be a driven arm of the assembly, that is move about the fixed pivot under the action of the other components of the assembly. The assembly of the present invention is particularly advantageous when the first arm operates as a driving arm.

The first position on the first arm may be at any suitable location thereon. In one preferred embodiment, the first position is at or adjacent the first end of the first arm.

The assembly further comprises a second arm. The second arm may have any shape and configuration. A preferred form for the second arm is an elongate member, for example a bar or a rod. The second arm is pivotably mounted at a first position on the second arm to a second fixed pivot. The pivotable connection at the first position may be of any suitable form, preferably a pin, spindle or axle passing through the arm about which the arm is free to move.

The second arm may function as a driving arm for the assembly, that is have a force applied thereto so as to rotate the arm about the fixed pivot at the first position on the arm, thereby transferring drive to the other components of the assembly. Alternatively, the second arm may be a driven arm of the assembly, that is move about the fixed pivot under the action of the other components of the assembly. The assembly of the present invention is particularly advantageous when the second arm operates as a driving arm.

The first position may be in any suitable location on the second arm. In one preferred embodiment, the first position is at or adjacent one end of the second arm.

The assembly further comprises a third arm. The third arm may have any shape and configuration. A preferred form for the third arm is an elongate member, for example a bar or a rod. The third arm is pivotably mounted at a first position on the third arm to the second arm. The pivotable connection between the second and third arms may be of any suitable form, preferably a pin, spindle or axle passing through the arms about which one or both of the arms are free to move.

The third arm is pivotably connected to the second arm at a first position on the third arm and a second position on the second arm. The first position may be in any suitable location on the third arm. In one preferred embodiment, the first position is at or adjacent one end of the third arm.

The second position on the second arm is spaced apart from the first position on the second arm. In one preferred embodiment, the second position on the second arm is at or adjacent the second end of the second arm.

In operation of the assembly, as noted above, the third arm has a point thereon that follows the path of a straight line when the assembly is moved between the retracted and first extended positions. This point on the third arm is spaced apart from the first position on the third arm, that is the position on the third arm at which the second and third arms are pivotably connected together. The location of this point on the third arm will depend upon aspects of the geometry of the other components of the assembly and the location of their interconnections, in particular the lengths of the first and second arms and the first and second connecting arms.

The third arm may be a driven arm, that is moved under the action of movement of the first and second arms. In this case, rotation of the first arm about the first fixed pivot and/or the second arm about the second fixed pivot causes the third arm to move, such that the said point on the third arm follows the straight line path between the retracted and first extended positions. Alternatively, the third arm may be a driving arm, that is have a force applied thereto resulting in movement of the third arm, which in turn drives the other components of the assembly to result in movement of the first arm about the first fixed pivot and motion of the second arm about the second fixed pivot. For example, application of a straight line force to the said point on the third arm between the retracted and first extended positions results in rotational movement of the first and second arms about their respective fixed pivots.

As noted above, the assembly further comprises a fourth arm. As with the first, second and third arms, the fourth arm may have any shape and configuration. A preferred form for the fourth arm is an elongate member, for example a bar or a rod. The fourth arm is pivotably mounted at a first position on the fourth arm to the second arm. The pivotable connection between the second and fourth arms may be of any suitable form, preferably a pin, spindle or axle passing through the arms about which one or both of the arms are free to move.

The fourth arm is pivotably connected to the second arm at a first position on the fourth arm and a third position on the second arm. The first position may be in any suitable location on the fourth arm. In one preferred embodiment, the first position is at or adjacent one end of the fourth arm.

The third position on the second arm is spaced apart from the first position on the second arm. In one preferred embodiment, the second position on the second arm is at or adjacent the second end of the second arm. It is particularly preferred that the third position on the second arm is coincident with the second position on the second arm, that is the third and fourth arms are pivotally connected to the second arm at the same location on the second arm.

In operation of the assembly, as noted above, the fourth arm has a point thereon that follows the path of a straight line when the assembly is moved between the retracted and the second extended positions. This point on the fourth arm is spaced apart from the first position on the fourth arm, that is the position on the fourth arm at which the second and fourth arms are pivotably connected together. The location of this point on the fourth arm will depend upon aspects of the geometry of the other components of the assembly and the location of their connections, in particular the lengths of the various arms, in particular the first and second arms and the second and third connecting arms.

The fourth arm may be a driven arm, that is moved under the action of movement of the first and second arms. In this case, rotation of the first arm about the first fixed pivot and/or the second arm about the second fixed pivot causes the fourth arm to move, such that the said point on the fourth arm follows the straight line path between the retracted and second extended positions. Alternatively, the fourth arm may be a driving arm, that is have a force applied thereto resulting in movement of the fourth arm, which in turn drives the other components of the assembly to result in movement of the first arm about the first fixed pivot and motion of the second arm about the second fixed pivot. For example, application of a straight line force to the said point on the fourth arm between the retracted and second extended positions results in rotational movement of the first and second arms about their respective fixed pivots.

Similarly, a force applied to one of the third and fourth arms, causing movement of the arm, in turn results in movement of the other of the third and fourth arms.

The distance between the first and second fixed pivots and the lengths of the first, second, third and fourth arms may be selected according to the desired movement of the components to be achieved and the particular application of the assembly. Specific embodiments of the assembly are described in detail below with reference to FIG. 1.

However, generally, the ratio of the length of the first arm, that is the distance between the first and second positions on the first arm, to the distance between the first and second fixed pivots may range from 0.5 to 2.0, more preferably from 0.6 to 1.75, still more preferably from 0.75 to 1.5. The first arm is preferably no longer than, more preferably shorter in length than the distance between the first and second fixed pivots. The ratio of the length of the first arm to the distance between the first and second fixed pivots is therefore more preferably from 0.75 to 0.99, still more preferably from 0.8 to 0.99, in particular from 0.9 to 0.99. A ratio of about 0.92 to about 0.98 is particularly suitable for many applications.

The length of the second arm may be considered to be the distance between the first position on the second arm and the furthest of the second and third positions from the first position. The ratio of the length of the second arm to the distance between the first and second fixed pivots may range from 0.5 to 2.0, more preferably from 0.6 to 1.75, still more preferably from 0.75 to 1.5. The second arm is preferably shorter in length than the distance between the first and second fixed pivots. The ratio of the length of the second arm to the distance between the first and second fixed pivots is therefore more preferably from 0.75 to 0.99, still more preferably from 0.8 to 0.99, in particular from 0.9 to 0.99. A ratio of about 0.92 to about 0.98 is particularly suitable for many applications.

The length of the second arm is preferably selected to be as long as possible, within the constraints of the other components of the assembly and the desired motion. In this way, the arc through which the second and third positions on the second arm move about the second fixed pivot has as large a radius as possible. This facilitates the positioning of the second connecting arm.

The second arm may be longer or shorter than the first arm. In one preferred embodiment, the first and second arms are of the same length.

Taking the length of the third arm to be the distance between the first position on the third arm and the said point on the third arm, the length of the third arm will be determined by the arrangement of the first and second arms, together with the connecting arms. In some embodiments, the length of the third arm is less than that of the first and second arms, in particular from 0.9 to 0.99 of the length of the first and/or second arms. For example, with the first and second arms being of equal length and less than the distance between the first and second fixed pivots, the third arm may have a length of about 0.975 that of the first and second arms. In alternative embodiments, the length of the third arm is the same as that of the first arm and/or the second arm.

In one particularly preferred arrangement, the first, second and third arms are the same length.

Similarly, taking the length of the fourth arm to be the distance between the first position on the fourth arm and the said point on the fourth arm, the length of the fourth arm will be determined by the arrangement of the first and second arms, together with the connecting arms. In some embodiments, the length of the fourth arm is less than that of the first and second arms, in particular from 0.9 to 0.99 of the length of the first and/or second arms. For example, with the first and second arms being of equal length and less than the distance between the first and second fixed pivots, the fourth arm may have a length of about 0.975 that of the first and second arms. In alternative embodiments, the length of the fourth arm is the same as that of the first arm and/or the second arm.

In one particularly preferred arrangement, the first, second and fourth arms are the same length.

The third and fourth arms may have the same or different lengths, with the third arm being longer or shorter than the fourth arm. In one preferred embodiment, the third and fourth arms are the same length.

The assembly further comprises a first connecting arm. The first connecting arm extends between the first arm and the third arm. The first connecting arm may have any shape and configuration. A preferred form for the first connecting arm is an elongate member, for example a bar or a rod. The first connecting arm is pivotably mounted to each of the first and third arms. The pivotable connections between the first connecting arm and each of the first and third arms may be of any suitable form, preferably a pin, spindle or axle passing through the arms about which one or both of the arms are free to move.

The pivotable connections may be at any suitable location on the first connecting arm. In one preferred embodiment, the pivotable connection between the first connecting arm and the first arm is at or adjacent one end of the first connecting arm and/or the pivotable connection between the first connecting arm and the third arm is at or adjacent the second end of the first connecting arm.

The first connecting arm is connected to the first arm at a second position on the first arm. The second position on the first arm is spaced apart from the first position on the first arm. In one preferred embodiment, the second position on the first arm is at or adjacent the second end of the first arm.

The first connecting arm is further connected to the third arm at a second position on the third arm, this second position being spaced apart from the first position on the third arm.

The first connecting arm may have any suitable length. Its length is preferably the distance between the positions on the first and third arms between which the first connecting arm extends.

The second position on the third arm, at which the first connecting arm is connected, may be selected according to a number of factors. First, the first connecting arm acts to provide support for the third arm, in particular to assist in supporting any load applied to the third arm. The requirement for the third arm to be supported in this manner by the first connecting arm is a factor in determining the location of the second position on the third arm. Second, the overall strength and stability of the assembly is related to the length of the first connecting arm, with the strength and stability reducing as the length of the first connecting arm increases.

The second position on the third arm may be at any suitable position. In particular, the ratio of the distance between the first position and the second position on the third arm and the distance between the first position and the said point on the third arm may be from 0.1 to 0.9, more preferably from 0.1 to 0.8, still more preferably from 0.1 to 0.7, in particular from 0.1 to 0.6. A preferred ratio is from 0.1 to 0.55. The ratio of the distance between the first position and the second position on the third arm and the distance between the first position and the said point on the third arm is preferably less than 0.75, more preferably less than 0.65, more preferably less than 0.55. A ratio of up to 0.5 has been found to be particularly suitable. One particularly preferred embodiment of the assembly has the ratio of the distance between the first position and the second position on the third arm and the distance between the first position and the said point on the third arm about 0.15 to about 0.35, more preferably about 0.2 to about 0.3, still more preferably about 0.23 to 0.28.

The assembly further comprises a second connecting arm. The second connecting arm extends between the first arm and the second arm. The second connecting arm may have any shape and configuration. A preferred form for the second connecting arm is an elongate member, for example a bar or a rod. The second connecting arm is pivotably mounted to each of the first and second arms. The pivotable connections between the second connecting arm and each of the first and second arms may be of any suitable form, preferably a pin, spindle or axle passing through the arms about which one or both of the arms are free to move.

The pivotable connections may be at any suitable location on the second connecting arm. In one preferred embodiment, the pivotable connection between the second connecting arm and the first arm is at or adjacent one end of the first connecting arm and/or the pivotable connection between the second connecting arm and the second arm is at or adjacent the second end of the second connecting arm.

The second connecting arm is connected to the first arm at a third position on the first arm, this third position being spaced apart from and between both the first and second positions on the first arm.

The third position on the first arm, at which the second connecting arm is connected, may be selected according to a number of factors. First, the second connecting arm acts to provide support for the first arm, in particular to assist in supporting any load applied to the first arm. The requirement for the first arm to be supported in this manner by the first connecting arm is a factor in determining the location of the third position on the first arm. Second, as with the first connecting arm, the overall strength and stability of the assembly is related to the length of the second connecting arm, with the strength and stability reducing as the length of the second connecting arm increases.

The third position on the first arm may be at any suitable position. In particular, the ratio of the distance between the first position and the third position on the first arm and the distance between the first position and the second position on the first arm may be from 0.1 to 0.9, more preferably from 0.2 to 0.8, still more preferably from 0.3 to 0.7, in particular from 0.4 to 0.6. A preferred ratio is from 0.4 to 0.55. The ratio of the distance between the first position and the third position on the first arm and the distance between the first position and the second position on the first arm is preferably less than 0.75, more preferably less than 0.65, more preferably less than 0.55. A ratio of up to 0.5 has been found to be particularly suitable. One particularly preferred embodiment of the assembly has the ratio of the distance between the first position and the third position on the first arm and the distance between the first position and the second position on the first arm about 0.4 to 0.5.

The second connecting arm is further connected to the second arm at a fourth position on the second arm. In one embodiment of the assembly, the fourth position is spaced apart from the first, second and third positions on the second arm. In one alternative embodiment, the fourth position on the second arm coincides with the second position on the second arm, such that the second connecting arm is connected to both the second and third arms. This arrangement has the advantage of being particularly compact. In a second alternative embodiment, the fourth position on the second arm coincides with the third position on the second arm, such that the second connecting arm is connected to both the second and fourth arms. This arrangement also has the advantage of being particularly compact. In a third alternative embodiment, the fourth position on the second arm coincides with both the second and third positions on the second arm, such that the second connecting arm is connected to the second, third and fourth arms. This is also a particularly compact arrangement.

The fourth position on the second arm is at or spaced from the second position on the second arm and may be at any suitable position. In particular, the ratio of the distance between the first position and the fourth position on the second arm and the distance between the first position and the second position on the second arm may be from 0.8 to 1.0, more preferably from 0.85 to 1.0, still more preferably from 0.875 to 1.0, in particular from 0.9 to 1.0. A preferred ratio is from 0.925 to 1.0. One particularly preferred embodiment of the assembly has the ratio of the distance between the first position and the fourth position on the second arm and the distance between the first position and the second position on the second arm about 0.95 to 1.0.

Similarly, the third position on the second arm is at or spaced from the third position on the second arm and may be at any suitable position. In particular, the ratio of the distance between the first position and the fourth position on the second arm and the distance between the first position and the third position on the second arm may be from 0.8 to 1.0, more preferably from 0.85 to 1.0, still more preferably from 0.875 to 1.0, in particular from 0.9 to 1.0. A preferred ratio is from 0.925 to 1.0. One particularly preferred embodiment of the assembly has the ratio of the distance between the first position and the fourth position on the second arm and the distance between the first position and the third position on the second arm about 0.95 to 1.0.

The second connecting arm may have any suitable length. Its length is preferably the distance between the first position and the farthest of the second, third and fourth position.

The assembly further comprises a third connecting arm. The third connecting arm extends between the first arm and the fourth arm. The third connecting arm may have any shape and configuration. A preferred form for the third connecting arm is an elongate member, for example a bar or a rod. The third connecting arm is pivotably mounted to each of the first and fourth arms. The pivotable connections between the first connecting arm and each of the first and fourth arms may be of any suitable form, preferably a pin, spindle or axle passing through the arms about which one or both of the arms are free to move.

The pivotable connections may be at any suitable location on the third connecting arm. In one preferred embodiment, the pivotable connection between the third connecting arm and the first arm is at or adjacent one end of the third connecting arm and/or the pivotable connection between the third connecting arm and the fourth arm is at or adjacent the second end of the third connecting arm.

The third connecting arm is connected to the first arm at a fourth position on the first arm. The fourth position on the first arm is spaced apart from the first position on the first arm. In one embodiment, the fourth position on the first arm is at or adjacent the second end of the first arm. In one preferred embodiment, the fourth position on the first arm is coincident with the second position on the first arm, that is the first and third connecting arms are pivotally connected to the first arm at the same location.

The third connecting arm is further connected to the fourth arm at a second position on the fourth arm, this second position being spaced apart from the first position on the fourth arm.

The third connecting arm may have any suitable length. Its length is preferably the distance between the positions on the first and fourth arms between which the second connecting arm extends.

The second position on the fourth arm, at which the third connecting arm is connected, may be selected according to a number of factors. First, the third connecting arm acts to provide support for the fourth arm, in particular to assist in supporting any load applied to the fourth arm. The requirement for the fourth arm to be supported in this manner by the third connecting arm is a factor in determining the location of the second position on the fourth arm. Second, the overall strength and stability of the assembly is related to the length of the third connecting arm, with the strength and stability reducing as the length of the third connecting arm increases.

The second position on the fourth arm may be at any suitable position. In particular, the ratio of the distance between the first position and the second position on the fourth arm and the distance between the first position and the said point on the fourth arm may be from 0.1 to 0.9, more preferably from 0.2 to 0.8, still more preferably from 0.3 to 0.7, in particular from 0.35 to 0.6. A preferred ratio is from 0.4 to 0.55. The ratio of the distance between the first position and the second position on the fourth arm and the distance between the first position and the said point on the fourth arm is preferably less than 0.75, more preferably less than 0.65, more preferably less than 0.55. A ratio of up to 0.5 has been found to be particularly suitable. One particularly preferred embodiment of the assembly has the ratio of the distance between the first position and the second position on the fourth arm and the distance between the first position and the said point on the fourth arm about 0.41 to about 0.47.

The second position on the fourth arm may be at the same relative location as the second position on the third arm. Preferably, the second position on the third arm is at a different relative position to the second position on the fourth arm. In this way, the third and fourth arms are at different positions at all points in movement from the retracted position.

In one preferred embodiment, the distance between the first and second positions on the fourth arm is greater than the distance between the first and second positions on the third arm. In this way, as the assembly is moved from the retracted condition, the third arm leads the fourth arm and moves ahead of the fourth to the extended position and beyond.

The ratio of the distance between the first and second positions on the fourth arm to the distance between the first and second positions on the third arm may be from 1.0 to 3.0, more preferably from 1.3 to 2.0, still more preferably from 1.5 to 2.0. A ratio of about 1.5 has been found to be particularly advantageous. Embodiments of the assembly with such a ratio may be arranged such that the said point on the fourth arm is at the second extended position, that is at the end of its path of linear motion, when the third arm is substantially perpendicular to the line extending between the first and second fixed pivots.

In general, the arms and connecting arms move parallel to one another. In other words, the arms and connecting arms may each be considered to move in a plane that is coincident with or parallel to the plane of one or more of the other arms and connecting arms. In use, a number of the arms and connecting arms cross one another. It is advantageous if the arms or connecting arms that cross in this manner are slidably connected to one another. In particular, a first arm or connecting arm that crosses a second arm or connecting arm may be slidably connected to the second arm or connecting arm. For example, a first arm or connecting arm is provided with a member that slides therealong, the member being connected, preferably pivotally connected, to a second arm or connecting arm that crosses the first in use. In this way, the rigidity of the two arms so interconnected is increased, in particular increasing the lateral stability of the arms and preventing their movement out of the normal plane of movement.

In one preferred embodiment, the first arm is slidably connected to the second arm. More particularly, one of the first and second arms is preferably provided with a member that slides therealong. The member is pivotally connected to the other of the first and second arms. In one preferred arrangement, the sliding member is mounted on the second arm.

The assembly may comprise further arms and respective connecting arms, arranged as described above in respect of the third arm and first connecting arm and the fourth arm and third connecting arm. Thus, the assembly may comprise a fifth arm and a fourth connecting arm, each arranged in an analogous manner to that of the fourth arm and third connecting arm, as described hereinbefore. The second position on the fifth arm is at a different relative location on the arm to the second position of both the third and fourth arms. This ensures the fifth arm is at a different position and orientation to both the third and fourth arms, as described hereinbefore. Similarly, the assembly may comprise a sixth arm and fifth connecting arm, also arranged in analogous manner.

Relative movement of the components of the assembly may be limited or restricted, for example to limit the movement of the third arm such that the motion of the said point is confined to a straight line between the retracted and extended positions. Suitable means for limiting the relative movement of components of the assembly include a flexible tie or tether extending between two of the arms or connecting arms. In one embodiment, a flexible tie or tether extends between the first arm and the third arm or the fourth arm, in particular between a point on the first arm between the first and fourth positions thereon and the first position on the third arm or the fourth arm. One preferred form for the flexible tie comprises a plurality of hingedly connected arms or arm assemblies moveable between a folded condition when the assembly is in the retracted position and a fully extended condition in an extended position.

In a particularly preferred embodiment of the assembly of the present invention, the lengths of the arms and the connecting arms are selected in accordance with the above criteria and to fold up when in the retracted position to lie between the first and second fixed pivots. It is a particular advantage that the assembly can be arranged to be in such a compact form when in the retracted position. In a preferred embodiment, the arms and the connecting arms are formed with portions having 'I', 'L' and/or 'U' shapes in cross-section, with the portions being arranged to allow the arms to be accommodated within one another when in the retracted position.

It is a further advantage of the assembly of the present invention that it is highly scaleable and may be constructed and applied at a wide range of scales to convert motion, as described hereinbefore.

The assembly finds wide applications and uses, in particular by allowing relative movement between a first component, a second component and a third component.

Accordingly, in a further aspect, the present invention provides an assembly comprising a first component, a second component and a third component, the second and third components being arranged for movement with respect to the first component, wherein an assembly as hereinbefore described is provided between the first component and the second and third components, operation of the assembly providing movement of the second and third components with respect to the first component.

One of the second and third components is connected to the third arm of the assembly, the other of the second and third components being connected to the fourth arm. The first component provides the first and second fixed pivot points to which the first and second arms are pivotally connected. In this way, movement of the second and third components with respect to the first component is effected. As noted above, such relative movement may be effected by applying a force to the first arm, the second arm or to the third or fourth arms of the assembly.

Provision for further components to be moved in like manner may be made by the inclusion of further arms and connecting arms in the assembly, as hereinbefore described.

The assembly comprising the first, second and third components finds extensive use in providing relative movement between a plurality of components. For example, the assembly finds use in moving a first component connected to either of the first or second arms and rotating about the respective first or second fixed pivot, a second component connected to the said point on the third arm and moveable in a linear motion between the retracted and first extended positions, and a third component connected to the said point on the fourth arm and moveable in a linear motion between the retracted and second extended positions. Further, the assembly finds use in displacing and rotating a component connected to one of the third or fourth arms relative to the first or second fixed pivots or the line extending therebetween.

In many applications, a plurality of assemblies is employed. In particular, a plurality of assemblies may be employed in a spaced apart relationship on opposing sides of objects to be moved. For example, a first and second assembly may be provided on opposing sides of an object to be moved with the third or fourth arms of the two assemblies connected to opposing sides of the object.

Applications of the assembly of the present invention to convert rotational motion to linear motion include the support and movement of building structures relative to one another.

Accordingly, the present invention further provides a building comprising:

a first building portion, a second building portion and a third building portion, the second building portion being moveable relative to the first building portion between a retracted position and a first extended position and the third building portion being moveable relative to the first building portion between a retracted position and a second extended position;

wherein relative movement between the first, second and third building portions and support of the second and third building portions with respect to the first building portions are provided by an assembly as hereinbefore described.

The first building portion may be any structure or part of a building, in particular a fixed structure, such as a house, apartment or office building, or a mobile building structure, such as a mobile house, caravan or the like. The second and third building portions may be any structures or components of the installation that are required to be moved in a coordinated manner relative to the first building portion between the retracted and extended positions. Examples of such structures include balconies, floor extensions, roof extensions, canopies and the like.

The principles and operation of the assembly of the present invention will be further explained by reference to the accompanying figures, in which.

Figure 1:
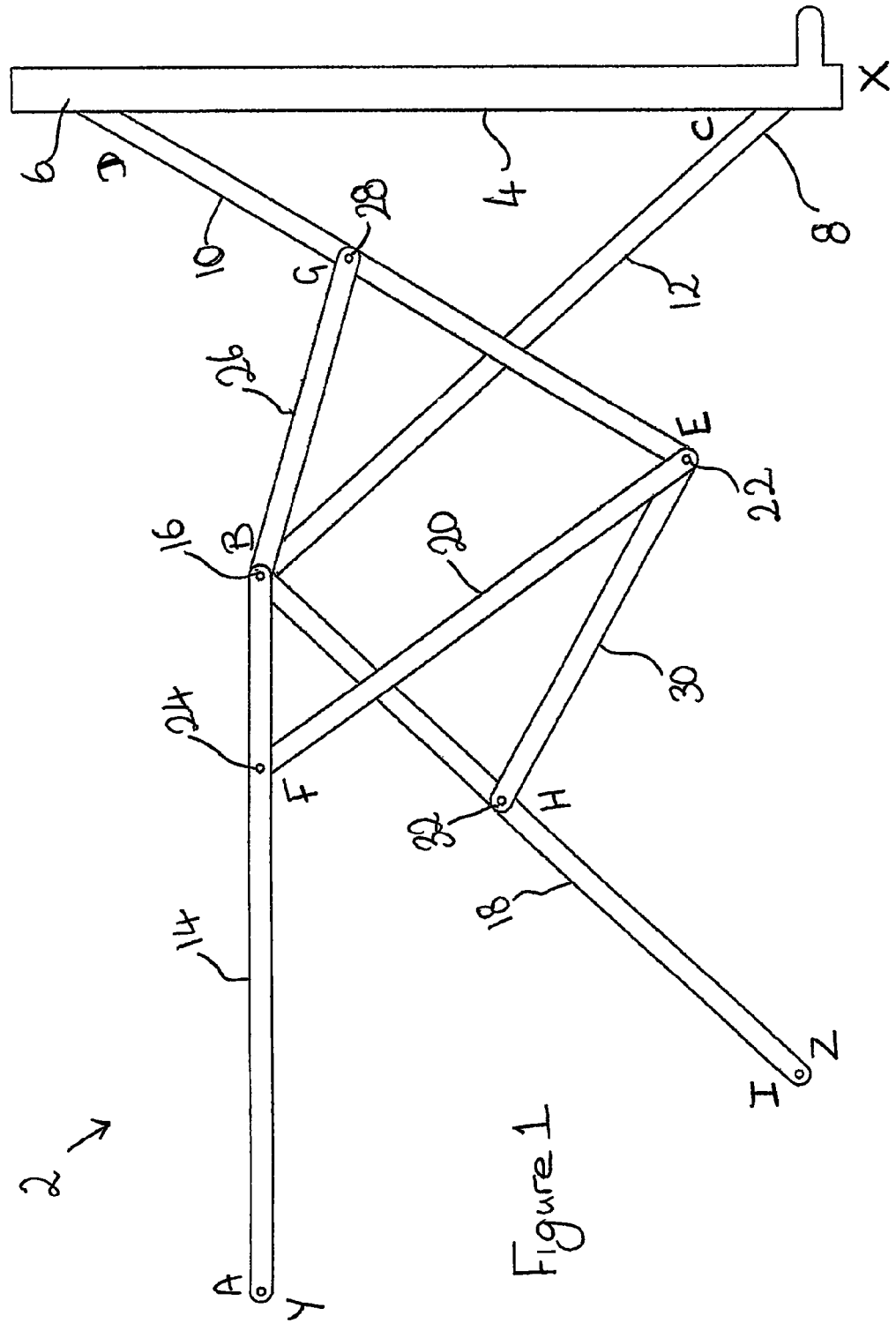
FIG. 1 is a simplified diagrammatical representation of an assembly according to the present invention in an extended position.

Turning to FIG. 1, there is shown a diagrammatical representation of an assembly of one embodiment of the present invention, generally indicated as 2. The assembly 2 is shown mounted to a fixed structure 4 at a first fixed pivot 6 and a second fixed pivot 8. The fixed pivots 6, 8 are spaced apart and are fixed in relation to one another.

A first arm 10 is pivotally connected at a first position D at one end to the first fixed pivot 6. A second arm 12 is pivotally connected at a first position C at one end to the second fixed pivot 8. A third arm 14 is mounted at one end by a pivot connection 16 at the second end of the second arm 12. A fourth arm 18 is also mounted at one end by the pivot connection 16 on the second end of the second arm 12. The position of this connection between the second, third and fourth arms is indicated as B in FIG. 1.

A first connecting arm 20 is mounted at one end by a pivot connection 22 at the second end of the first arm 10, the position of this connection being indicated as E in FIG. 1. The second end of the first connecting arm is mounted by a pivot connection 24 to the third arm at a position F spaced from the position B.

A second connecting arm 26 is mounted at one end by a pivot connection 28 to the first arm at a position G spaced from both positions D and E. The second end of the second connecting arm 26 is mounted to the pivot connection 16 and thus to the second, third and fourth arms at the position B.

A third connecting arm 30 is mounted at one end by the pivot connection 22 to the first arm at the position E. The second end of the third connecting arm 30 is mounted by a pivot connection 32 to the fourth arm at a position H, spaced from the position B.

The pivot connections may be formed by any suitable means, for example by pins extending through holes in the arms being pivotally joined.

Movement of the first arm 10 about the first fixed pivot 6 and the second arm 12 about the second fixed pivot 8 causes the third arm 14 to move such that a point A on the third arm moves between a retracted position X and an extended position Y. In moving between the positions X and Y, the point A describes a first path that is a substantially straight line and then an arcuate path, such that the third arm 14 is both rotated and displaced relative to the line joining the first and second pivot points 6, 8. The aforementioned movement of the first and second arms 10, 12 also causes the fourth arm 14 to move such that a point I on the fourth arm moves between the retracted position X and an extended position Z. In moving between the positions X and Z, the point I on the fourth arm traces a substantially straight line path.

A first exemplary arrangement of the assembly of FIG. 1 has the dimensions set out in Table 1.

TABLE 1

| Dimension of assembly of FIG. 1 | Length (mm) |
| --- | --- |
| C-D | 3250 |
| D-E | 3000 |
| C-B | 3000 |
| B-A | 3000 |
| D-G | 1460 |
| B-F | 495 |
| E-F | 2255 |
| E-H | 1540 |
| B-I | 3000 |
| G-B | 1210 |
| B-H | 1210 |
| X-Z | 3296 |

The arrangement of Table 1 provides movement of point I on the fourth arm to follow an approximate straight line X-Z perpendicular to the line joining the fixed pivots at points C and D, the straight line having a length of 3296 mm and a maximum deviation from a straight line of 8 mm. The same movement of the assembly results in the point A on the third arm moving from position X to position Y, first following a straight line path similar to that of the path X-Z, and thereafter moving through an arc. The result is the rotation and displacement of the third arm relative to the line joining the fixed pivots.

The sequence of movement of the components of the assembly 2 of FIG. 1 is shown in FIGS. 2 to 7.

Figure 2:
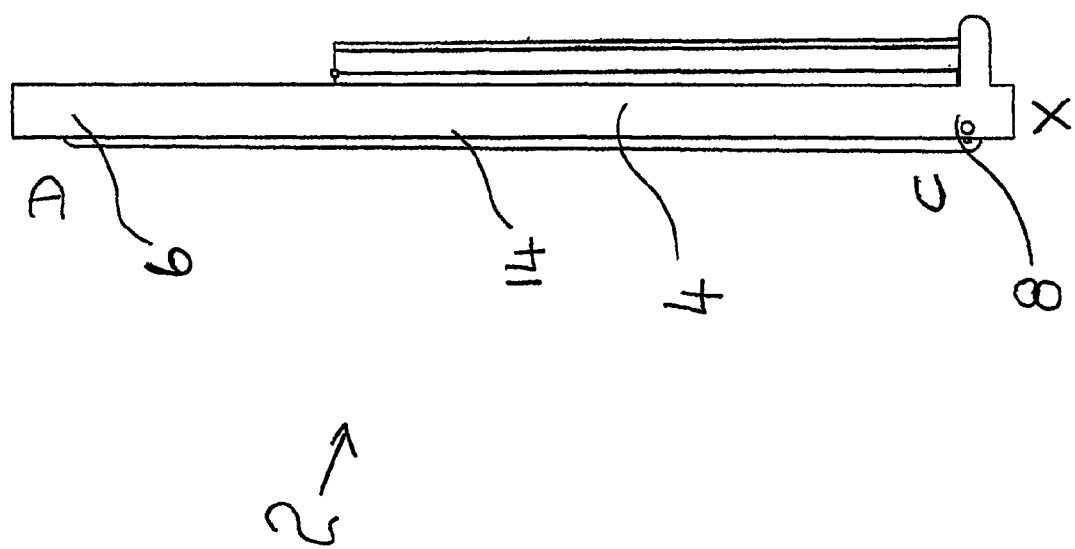
FIG. 2 is a diagrammatical representation of the assembly of the assembly of FIG. 1 in a retracted position.

Referring to FIG. 2, the assembly 2 is shown in a retracted position held within fixed structure 4, providing the mounting for the fixed pivots 6 and 8. The fixed structure 4 may be any suitable structure, for example a frame or other support assembly on the outer portion of a building. The arms of the assembly are formed to lie within one another when in the retracted position of FIG. 2, in particular with the arms having appropriate flat, 'L'-shaped and 'U'-shaped forms at portions along their lengths. In this way, the assembly 2 occupies the minimum amount of space when in the retracted position.

Figure 3:
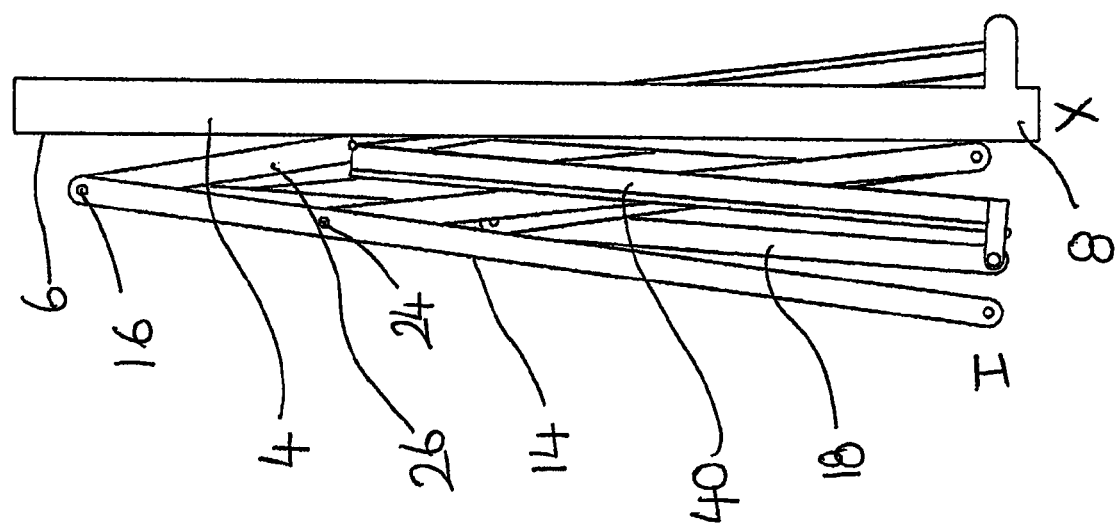
FIG. 3 is a diagrammatical representation of the assembly of FIG. 1 in a first partially extended position.

The assembly 2 is shown in FIG. 3 in a first partially extended position, with the third arm 14 and fourth arm 18 having moved away from the fixed pivots 6, 8 and the fixed structure, that is to the left as viewed in the figure. In the movement from the position of FIG. 2 to the position of FIG. 2, the point A at the end of the third arm 14 and the point Z at the end of the fourth arm 18 are both following a substantially straight line. It will be noted that the third arm 14 is leading the fourth arm 18 in their motion to the left, as viewed in FIG. 3.

Figure 4:
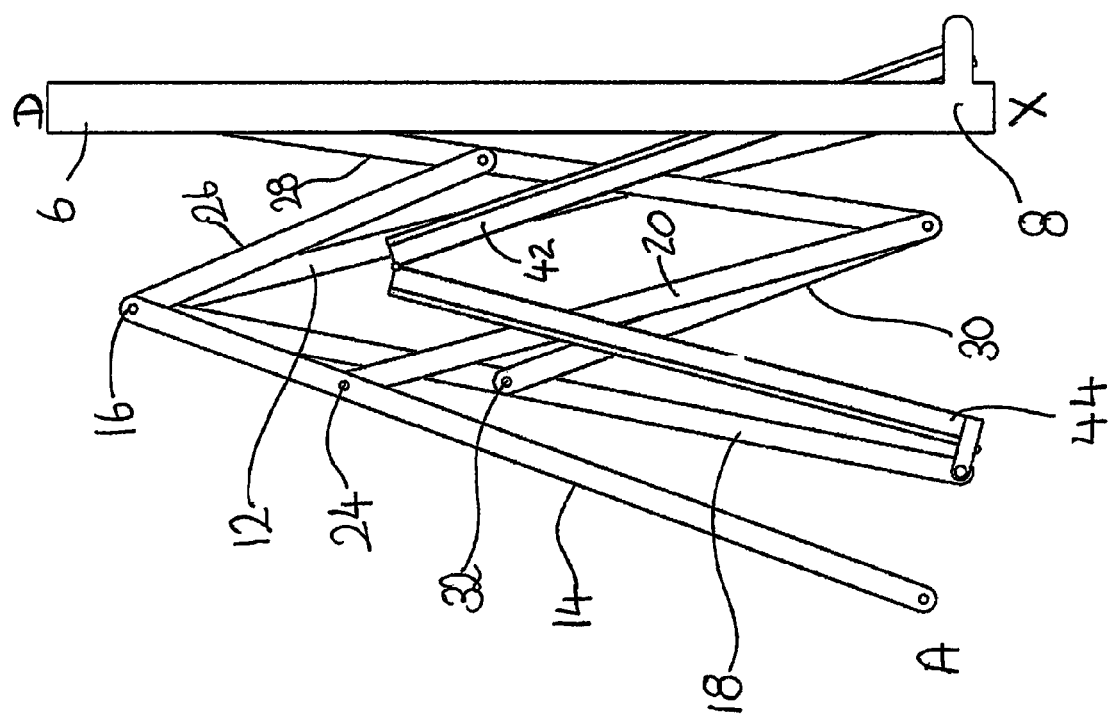
FIG. 4 is a diagrammatical representation of the assembly of FIG. 1 in a second partially extended position.

FIG. 4 shows the assembly 2 in a second partially extended position, with the third arm 14 and the fourth arm 18 both moved further away from the fixed pivots 6, 8. Again, point A on the third arm 14 and point Z on the fourth arm 18 are both tracing a substantially straight line from its position in the retracted position of FIG. 2.

Figure 5:
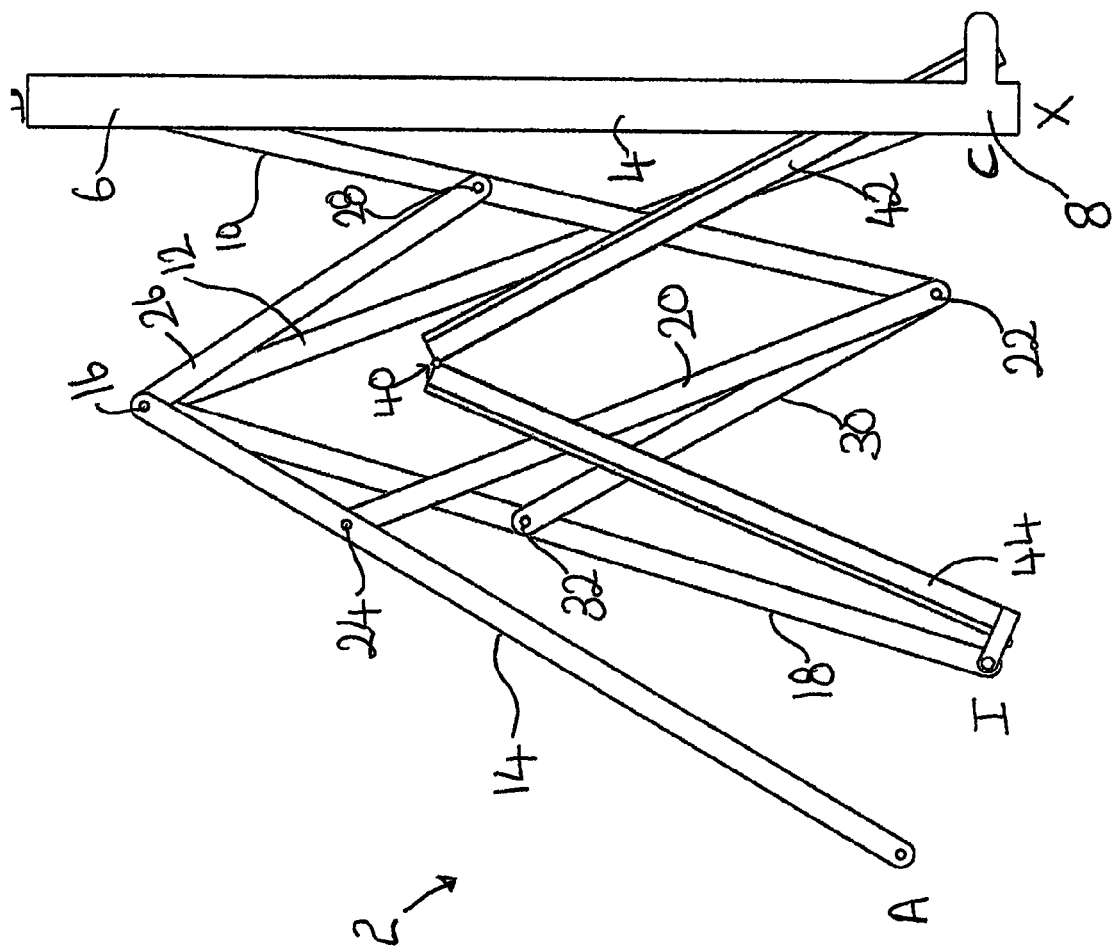
FIG. 5 is a diagrammatical representation of the assembly of FIG. 1 in a third partially extended position.

Similarly, FIG. 5 shows the assembly 2 in a third partially extended position, with the third and fourth arms 14, 18 still further from the fixed pivots 6, 8. The point Z on the fourth arm 18 is still following a straight line path. The point A on the third arm 14 has moved past the extended position at the end of its path of linear motion and has moved upwards, as viewed in FIG. 5, in an arc.

Figure 6:
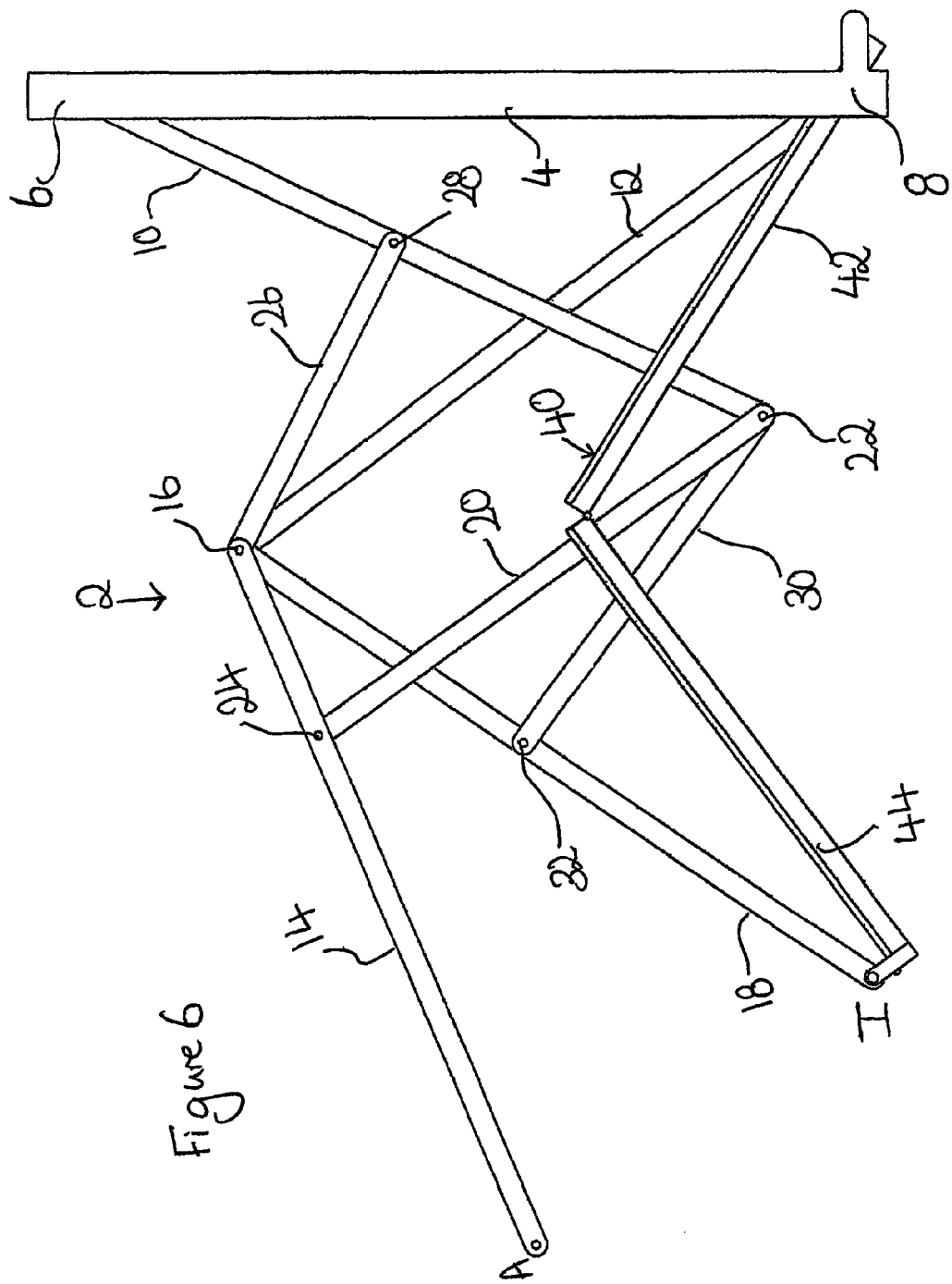
FIG. 6 is a diagrammatical representation of the assembly of FIG. 1 in a further partially extended position.

FIG. 6 shows the assembly 2 in a fourth partially extended position, with the third and fourth arms 14, 18 still further from the fixed pivots 6, 8. The point Z on the fourth arm 18 is still following a straight line path. The point A on the third arm 14 has moved further upwards, as viewed in FIG. 5, in an arc.

Figure 7:
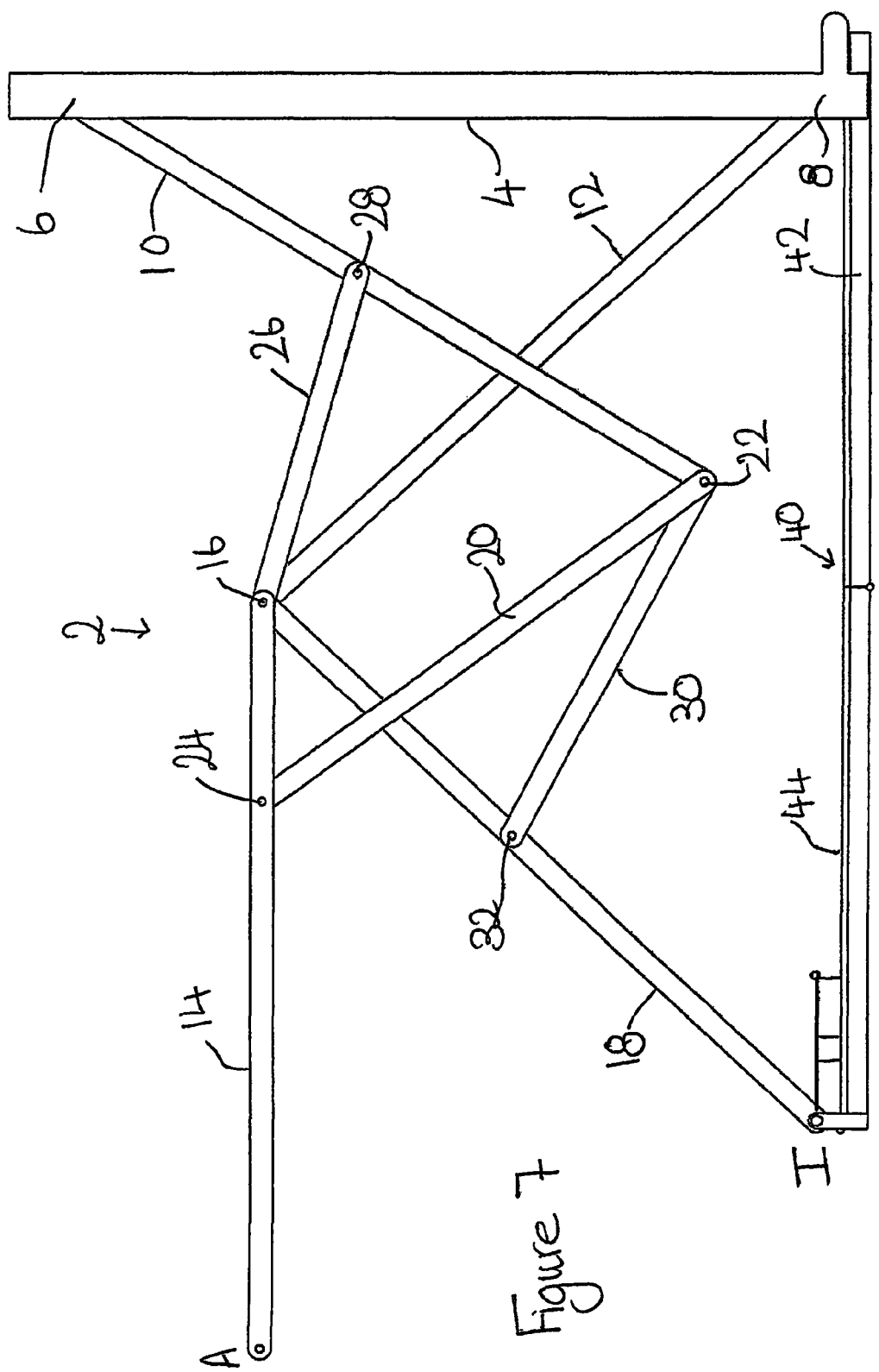
FIG. 7 is a diagrammatical representation of the assembly of FIG. 1 in an extended position.
Figure 8:
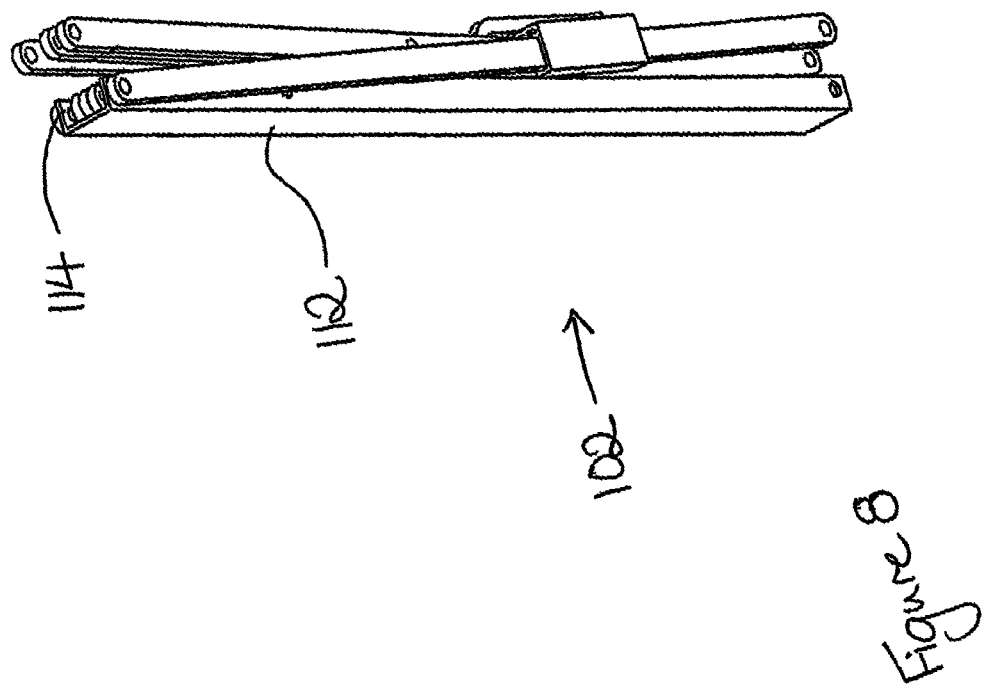
FIG. 8 is a diagrammatical representation of an assembly of a further embodiment of the present invention in a retracted position.
Figure 9:
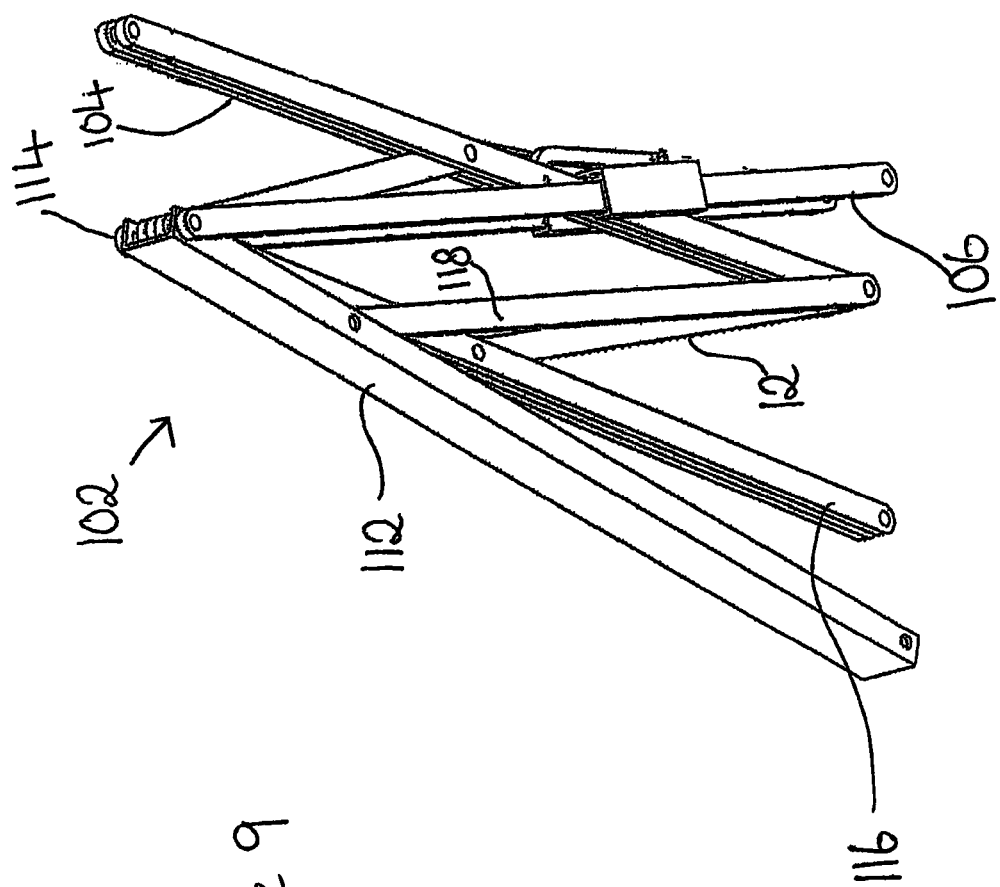
FIG. 9 is a diagrammatical representation of the assembly of FIG. 8 in a first partially extended position.
Figure 10:
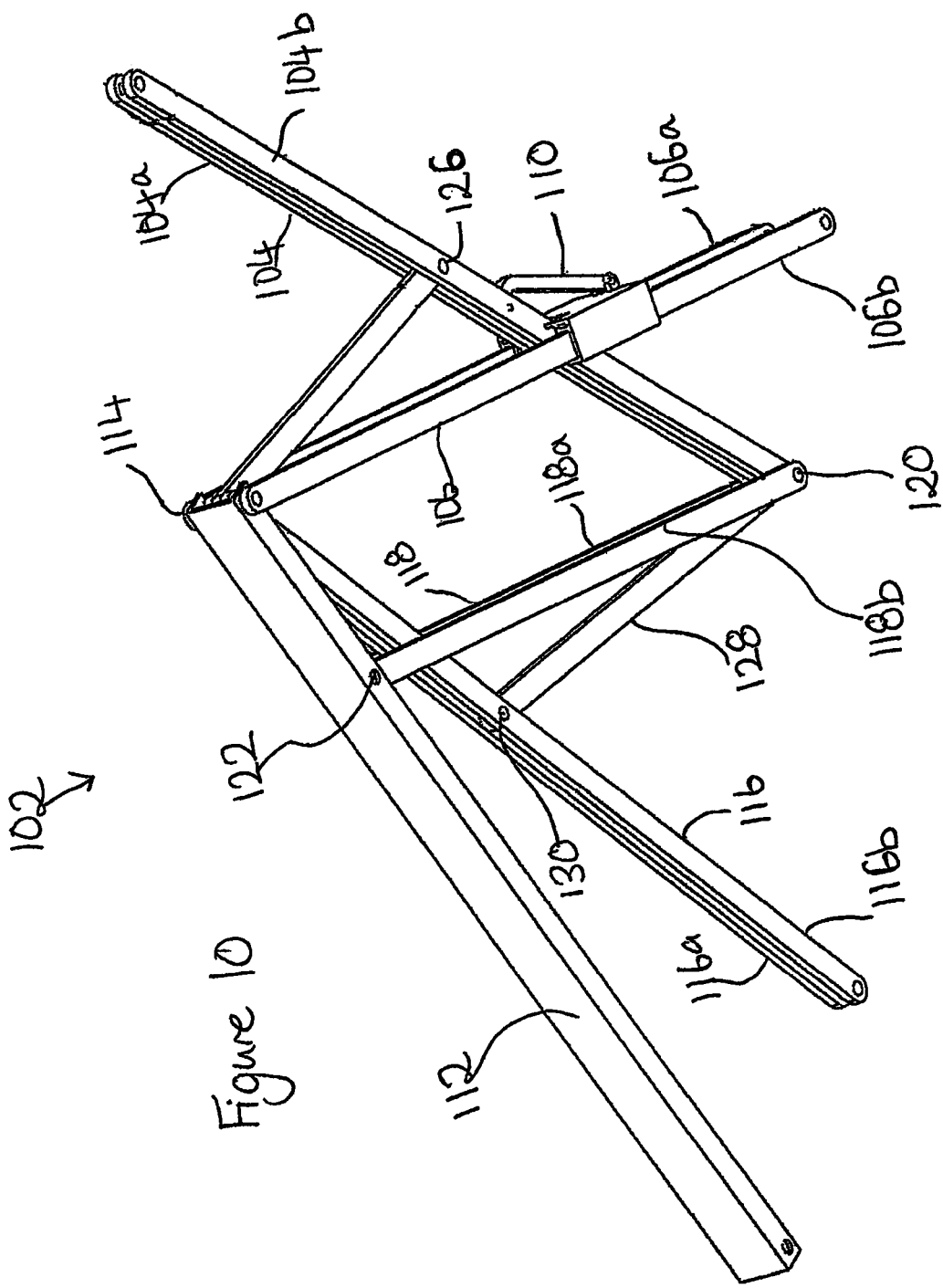
FIG. 10 is a diagrammatical representation of the assembly of FIG. 8 in a second partially extended position.
Figure 11:
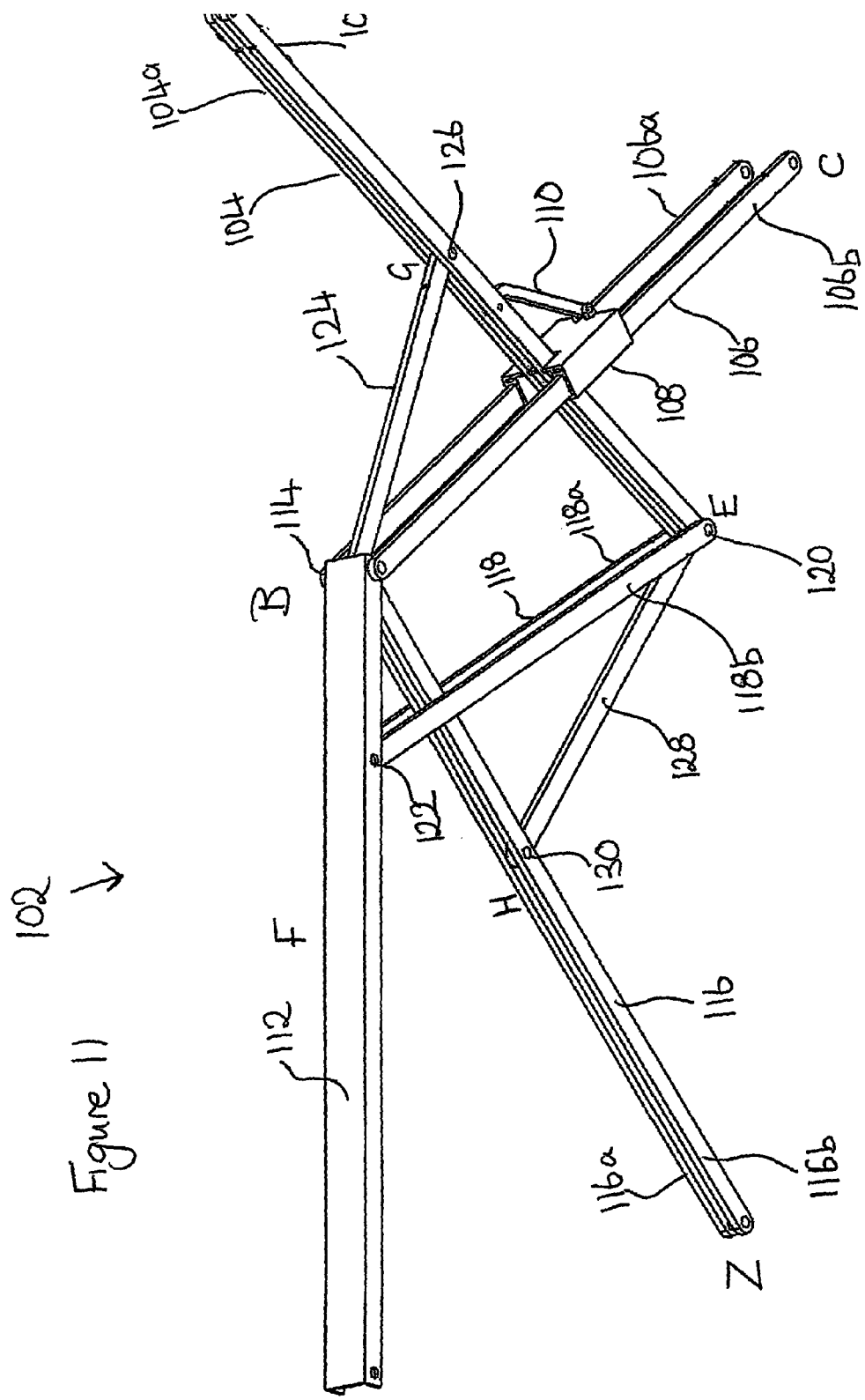
FIG. 11 is a diagrammatical representation of the assembly of FIG. 8 in a third partially extended position.
Figure 12:
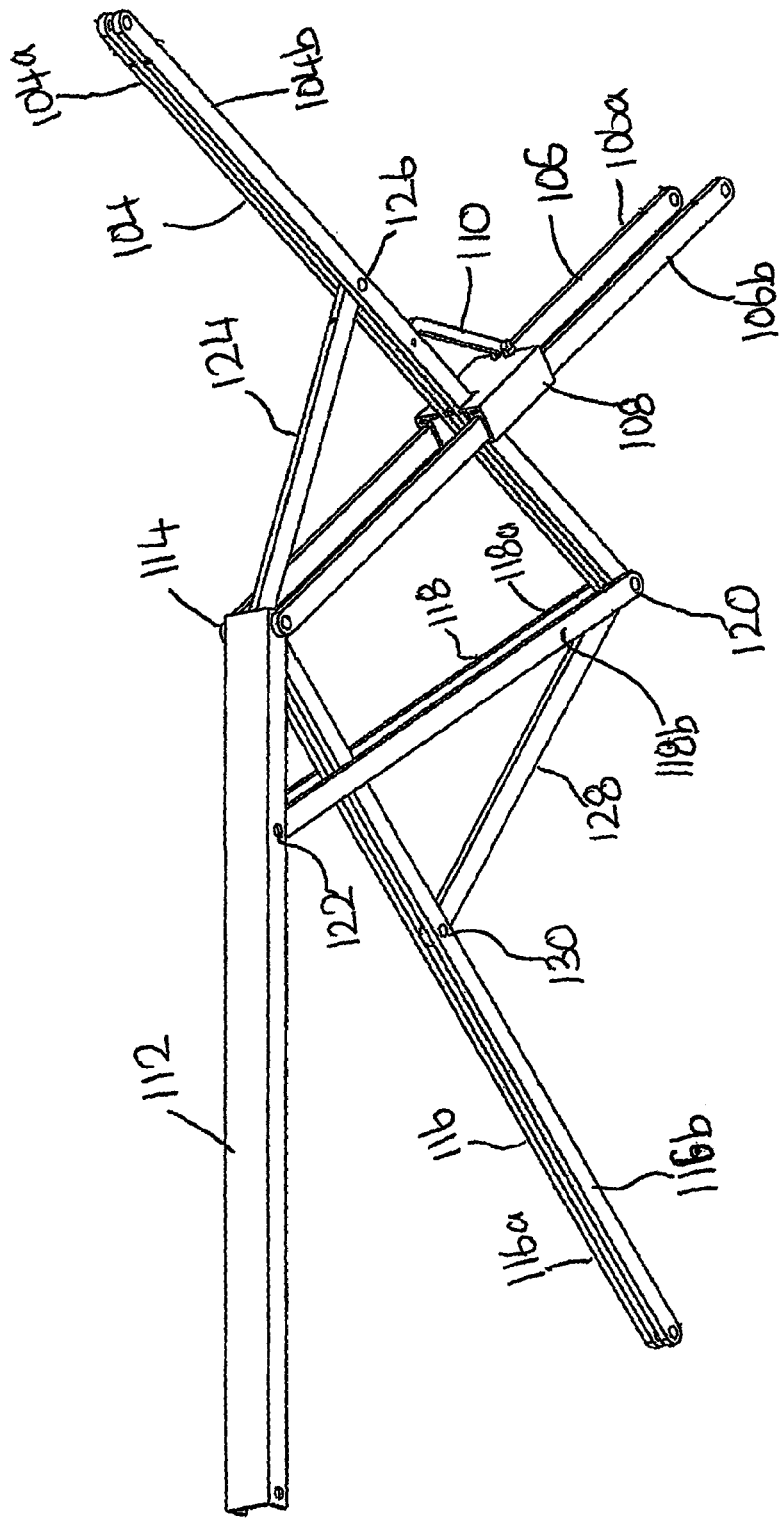
FIG. 12 is a diagrammatical representation of the assembly of FIG. 8 in an extended position.

FIG. 7 shows the assembly 2 in its extended position, that is with the fourth arm 18 at a position where the point Z is at the end of the straight line path followed from the retracted position. The third arm 14 has moved to a substantially horizontal position, as viewed in FIG. 7, perpendicular to the vertical fixed structure 4.

Further movement of the assembly beyond the extended position shown in FIG. 7 is prevented by an assembly extending between the fixed structure 4 and the point Z on the fourth arm 18. Any suitable assembly may be used to limit the movement in this way. In the embodiment shown in FIGS. 2 to 7, the assembly comprises a foldable floor assembly 40, having a first floor section 42 and a second floor section 44. The first floor section 42 is pivotally attached to the fixed structure at or adjacent the fixed pivot point 8 on the fixed structure 4. The second floor section 44 is hingedly attached at one edge to the free edge of the first floor assembly 42 and pivotally connected to the fourth arm 18 at the point Z. As can be seen in the sequence from FIG. 2 to FIG. 7, the action of the fourth arm 18 moving with the point Z tracing a straight line path is to unfold the floor assembly 40 from the retracted position of FIG. 2, in which the floor sections are folded vertically, to an extended position shown in FIG. 7, in which the floor sections 42, 44 are lying horizontally.

Turning to FIGS. 8 to 12, there is shown an assembly of a further embodiment of the present invention. The assembly, generally indicated as 102, is shown in a sequence from a retracted position in FIG. 8 to a fully extended position in FIG. 12. The assembly 102 has the same general configuration and operation as the embodiment shown in FIG. 1 and described above.

The assembly 102 comprises a first arm 104 pivotally connected at a first position D at one end to a first fixed pivot, not shown in FIGS. 8 to 12 for clarity. A second arm 106 is pivotally connected at a first position C at one end to a second fixed pivot, also omitted from FIGS. 8 to 12 for clarity. Reference is made to FIGS. 1 to 7 and the above description with respect to details of the fixed pivots to which the first and second arms 104, 106 are connected.

The first arm 104 comprises two arm portions 104a, 104b, arranged to extend parallel to and spaced apart from one another. Similarly, the second arm 106 comprises two arm portions 106a, 106b extending parallel to one another. The arm portions 106a, 106b of the second arm 106 are spaced apart a sufficient distance to accommodate the two arm portions 104a, 104b of the first arm 104, as shown in FIGS. 8 to 12. A slider 108 is slidably mounted on the second arm 106. A slider connecting arm 110 is pivotally mounted at one end to the slider 108 and pivotally mounted to the first arm 104 at the other end. In operation, as the first arm 104 moves relative to the second arm 106, the slider 108 is caused to slide along the second arm. The slider connecting arm 110 connects the first and second arms 104, 106 and provides increased stability to the arms, in particular providing lateral stability and resistance to any tendency of the first and second arms to move out of alignment, in turn acting to keep movement of the components of the assembly 102 substantially in a single plane.

A third arm 112 is mounted at one end by a pivot connection 114 at the second end of the second arm 106. The third arm 112 is in the form of an inverted U-shaped channel, to which are mounted components or assemblies to be moved.

A fourth arm 116 is also mounted at one end by the pivot connection 114 on the second end of the second arm 106. The position of this connection between the second, third and fourth arms is indicated as B in the figures. The fourth arm 116 is of similar construction to the first arm 104 and comprises first and second spaced apart, parallel arm portions 116a, 116b.

A first connecting arm 118 is mounted at one end by a pivot connection 120 at the second end of the first arm 104, the position of this connection being indicated as E in the figures. The second end of the first connecting arm 118 is mounted by a pivot connection 122 to the third arm 112 at a position F spaced from the position B. The first connecting arm 118 is of similar construction to the first arm 104 and comprises first and second spaced apart, parallel arm portions 118a, 118b. As shown in the figures, the arm portions 118a, 118b of the first connecting arm extend either side of the fourth arm, such that both arm portions 116a, 116b of the fourth arm 116 are accommodated between the arm portions of the first connecting arm.

A second connecting arm 124 is mounted at one end by a pivot connection 126 to the first arm 104 at a position G spaced from both positions D and E. The second end of the second connecting arm 124 is mounted to the pivot connection 114 and thus to the second, third and fourth arms at the position B. The second connecting arm 124 is formed as a single member arm, as shown in the figures.

A third connecting arm 128 is mounted at one end by the pivot connection 120 to the first arm at the position E. The second end of the third connecting arm 128 is mounted by a pivot connection 130 to the fourth arm at a position H, spaced from the position B. Similar to the second connecting arm, the third connecting arm 128 is formed as a single member arm.

The pivot connections may be formed by any suitable means. In the arrangement shown in FIGS. 8 to 12, the pivot connections are formed by pins extending through holes in the arms being pivotally joined.

The relative dimensions of the components of the assembly 102 are determined by the function to be performed. As an example, the relative dimensions may be those set out in Table 1 above.

The operation of the assembly 102 of FIGS. 8 to 12 is generally as described with respect to the assembly of FIGS. 2 to 7. As noted above, increased lateral stability of the arms is provided by the sliding connection between the first and second arms 104, 106. The progression of the assembly from a retracted position to an extended position is shown in the sequence from FIG. 8 to FIG. 12. Movement of the assembly from the extended position to the retracted position proceeds in the sequence from FIG. 12 to FIG. 8.

The invention claimed is:

1. An assembly for converting motion, the assembly comprising:
    a first arm rotatable at a first position thereon about a first fixed pivot;
    a second arm rotatable at a first position thereon about a second fixed pivot, the second fixed pivot spaced apart from the first fixed pivot;
    a third arm pivotably connected at a first position thereon to the second arm at a second position on the second arm, the second position spaced apart from the first position on the second arm;

a fourth arm pivotably connected at a first position thereon to the second arm at a third position on the second arm;

a first connecting arm extending between the first arm and the third arm, the first connecting arm pivotably connected to a second position on the first arm spaced apart from the first position and pivotably connected to the third arm at a second position thereon spaced apart from the first position thereon;

a second connecting arm extending between the first arm and the second arm, the second connecting arm pivotably connected to a third position on the first arm disposed between the first and second positions thereon and pivotably connected to a fourth position on the second arm at a third position thereon; and a third connecting arm extending between the first arm and the fourth arm, the third connecting arm pivotably connected to a fourth position on the first arm and pivotably connected to a second position on the fourth arm.

2. The assembly according to claim 1, wherein the arms are arranged to be accommodated adjacent to one another or within one another when in the retracted position.

3. The assembly according to claim 1, wherein the first position on the first arm is at or adjacent an end of the first arm.

4. The assembly according to claim 1, wherein the first position on the second arm is at or adjacent an end of the second arm; the second position on the second arm is at or adjacent an end of the second arm; the first position on the third arm is at or adjacent an end of the third arm; and the first position on the fourth arm is at or adjacent an end of the fourth arm.

5. The assembly according to claim 1, wherein the length of the first arm is no greater than the distance between the first and second fixed pivots.

6. The assembly according to claim 1, wherein the length of the second arm is no greater than the distance between the first and second fixed pivots.

7. The assembly according to claim 1, wherein the length of the first and second arms is substantially the same.

8. The assembly according to claim 1, wherein the length of the third arm is no greater than the length of the first and/or the second arm; and wherein the length of the fourth arm is no greater than the length of the first and/or second arm.

9. The assembly according to claim 1, wherein the lengths of the third and fourth arms are substantially the same.

10. The assembly according to claim 1, wherein the lengths of the first, second, third and fourth arms are substantially the same.

11. The assembly according to claim 1, wherein the second position on the first arm is at or adjacent an end of the first arm.

12. The assembly according to claim 1, wherein the fourth position on the second arm coincides with the second position on the second arm, such that the second connecting arm is connected to both the second and third arms.

13. The assembly according to claim 1, wherein the fourth position on the first arm is at or adjacent an end of the first arm.

14. The assembly according to claim 1, wherein the second and fourth positions on the first arm coincide.

15. The assembly according to claim 1, wherein the fourth position on the second arm coincides with the third position on the second arm, such that the second connecting arm is connected to both the second and fourth arms.

16. The assembly according to claim 1, wherein the second third and fourth positions on the second arm coincide, such that the second connecting arm is connected to all of the second, third and fourth arms.

17. The assembly according to claim 1, further comprising means to limit the movement of the third arm with respect to the first and second fixed pivots.

18. The assembly according to claim 1, wherein one arm or connecting arm is slidably connected to another arm or connecting arm.

19. The assembly according to claim 18, wherein the first arm is slidably connected to the second arm.

20. The assembly according to claim 1 further comprising a first component, a second component and a third component, the second and third components being arranged for movement with respect to the first component, wherein the first and second fixed pivots are provided on the first component, the second component is connected to the third arm and the third component is connected to the fourth arm; operation of the assembly providing movement of the second and third components with respect to the first component.

21. The assembly according to claim 20, wherein the second component is moveable in a linear motion with respect to the first component between a retracted position and an extended position.

22. The assembly according to claim 20, wherein the third component is moveable with respect to the first component in a pattern that displaces and rotates the third component with respect to the first component.

* * * * *